United States Patent
Liao et al.

(10) Patent No.: US 10,651,479 B2
(45) Date of Patent: May 12, 2020

(54) METHOD OF RECOVERING METAL COMPOUNDS FROM SOLID OXIDE FUEL CELL SCRAP

(71) Applicant: BLOOM ENERGY CORPORATION, Sunnyvale, CA (US)

(72) Inventors: Lunzhi Liao, San Jose, CA (US); Christopher Jeffrey Hartley, Melbourne (AU); Andrew Sarmiento, Daly City, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 235 days.

(21) Appl. No.: 15/888,571

(22) Filed: Feb. 5, 2018

(65) Prior Publication Data
US 2019/0245216 A1    Aug. 8, 2019

(51) Int. Cl.
| | |
|---|---|
| *H01M 8/00* | (2016.01) |
| *H01M 8/008* | (2016.01) |
| *C22B 59/00* | (2006.01) |
| *C22B 7/00* | (2006.01) |
| *C01F 17/00* | (2020.01) |

(Continued)

(52) U.S. Cl.
CPC .......... *H01M 8/008* (2013.01); *C01F 11/005* (2013.01); *C01F 17/0006* (2013.01); *C01F 17/0043* (2013.01); *C01G 25/003* (2013.01); *C01G 25/006* (2013.01); *C01G 25/02* (2013.01); *C01G 45/003* (2013.01); *C01G 53/003* (2013.01); *C22B 7/007* (2013.01); *C22B 59/00* (2013.01)

(58) Field of Classification Search
CPC ..... H01M 8/008; C01F 11/02; C01F 17/0006; C01F 17/0043; C01G 25/003; C01G 25/006; C01G 25/02; C01G 45/003; C01G 45/02; C01G 53/003; C01G 53/04; C22B 7/007; C22B 59/00
USPC ... 423/21.1, 21.5, 263, 70, 85, 50, 140–142; 429/49
See application file for complete search history.

(56) References Cited

U.S. PATENT DOCUMENTS

| | | | |
|---|---|---|---|
| 3,288,570 A | 11/1966 | Henrickson | |
| 3,323,865 A | 6/1967 | Michener et al. | |

(Continued)

FOREIGN PATENT DOCUMENTS

| | | |
|---|---|---|
| CN | 105671304 A | 6/2016 |
| JP | 11-209831 | 8/1999 |

(Continued)

OTHER PUBLICATIONS

Wang et al, Journal of Environmental Chemical Engineering, 5(4), Jul. 8, 2017, pp. 3711-3718. (Year: 2017).*

(Continued)

*Primary Examiner* — Steven J Bos
(74) *Attorney, Agent, or Firm* — The Marbury Law Group PLLC

(57) ABSTRACT

A method of recovering metal compounds from solid oxide fuel cell scrap includes processing the solid oxide fuel cell scrap to form a powder, digesting the processed scrap, extracting lanthanum oxide and cerium oxide from a solution containing the digested processed scrap, extracting a zirconium compound from the solution after extracting the lanthanum oxide and cerium oxide, and extracting scandium compound from the solution extracting the zirconium compound from the solution.

17 Claims, 3 Drawing Sheets

(51) Int. Cl.
  *C01F 11/00* (2006.01)
  *C01G 25/00* (2006.01)
  *C01G 25/02* (2006.01)
  *C01G 53/00* (2006.01)
  *C01G 45/00* (2006.01)

(56) References Cited

U.S. PATENT DOCUMENTS

| | | |
|---|---|---|
| 6,658,466 B1 | 12/2003 | Ellestad et al. |
| 8,850,456 B2 | 9/2014 | Truschin et al. |
| 9,059,455 B2 * | 6/2015 | Gasda .................. H01M 8/008 |
| 9,102,999 B2 * | 8/2015 | Hartley ................ C22B 3/0098 |
| 10,047,414 B2 * | 8/2018 | Liao ........................ C22B 59/00 |
| 2011/0183233 A1 | 7/2011 | Armstrong et al. |
| 2012/0204680 A1 | 8/2012 | Duyvesteyn |
| 2013/0278658 A1 | 10/2013 | Metcalfe et al. |
| 2014/0193317 A1 | 7/2014 | Hartley et al. |
| 2015/0104361 A1 | 4/2015 | Boudreauit et al. |
| 2017/0233849 A1 | 8/2017 | Liao et al. |
| 2017/0244114 A1 | 8/2017 | Seiki et al. |
| 2018/0010211 A1 | 1/2018 | Goto et al. |

FOREIGN PATENT DOCUMENTS

| | | |
|---|---|---|
| JP | 2012178304 A | 9/2012 |
| JP | 2013057115 A | 3/2013 |
| WO | WO2013/190879 A1 | 12/2013 |

OTHER PUBLICATIONS

Translation of JP 2012-178304 A, for claim 1, [0013], [0026]-[0027](Year: 2012).*
International Search Report and Written Opinion of the International Search Authority for International Patent Application No. PCT/US2019/013132, dated Apr. 30, 2019, 10 pages.

* cited by examiner

US 10,651,479 B2

METHOD OF RECOVERING METAL COMPOUNDS FROM SOLID OXIDE FUEL CELL SCRAP

FIELD

The present invention relates generally to selectively recovering metal compounds from solid oxide fuel cells, and more particularly to extracting and recovering scandia from solid oxide fuel cell scrap.

BACKGROUND

Due to limitations in mining and availability, scandium is currently only produced in small quantities. While the element occurs in many ores, it is only present in trace amounts; there are no known, easily-extractable deposits of minerals containing high scandium content. Currently, only a few mines produce scandium, and in each case it is made as a byproduct from the extraction of other elements and sold as scandium oxide.

In particular, scandia has gained importance for the use of scandia stabilized zirconia as a high efficiency electrolyte in solid oxide fuel cells. Applications of scandium also include use of scandia (e.g., scandium oxide ($Sc_2O_3$)) to make high-intensity discharge lamps, and scandium-aluminum alloys that are used for minor aerospace industry components, baseball bats, and bicycle frames. As commercial uses for scandium continue to expand, there exists the need for the development of improved methods to obtain scandia.

SUMMARY OF THE INVENTION

According to various embodiments of the present disclosure, a method of recovering metal compounds from solid oxide fuel cell scrap includes processing the solid oxide fuel cell scrap to form a powder, digesting the processed scrap, extracting lanthanum oxide and cerium oxide from a solution containing the digested processed scrap, extracting a zirconium compound from the solution after extracting the lanthanum oxide and cerium oxide, and extracting scandium compound from the solution extracting the zirconium compound from the solution.

According to various embodiments of the present disclosure, a method of recovering metals from solid oxide fuel cell scrap includes processing the scrap, such that the scrap has an average particle size of less than about 100 µm; digesting the processed scrap; mixing the digested scrap with water to form a solution; adding a salt to the solution to form a precipitate comprising Ce and La; filtering the solution to separate the precipitate from a filtrate; and drying the precipitate to form a cake comprising $La_2O_3$ and $CeO_2$.

BRIEF DESCRIPTION OF THE DRAWINGS

The accompanying drawings, which are incorporated herein and constitute part of this specification, illustrate exemplary aspects of the invention. Together with the general description given above and the detailed description given below, the drawings serve to explain features of the invention.

DETAILED DESCRIPTION

Figure 1:
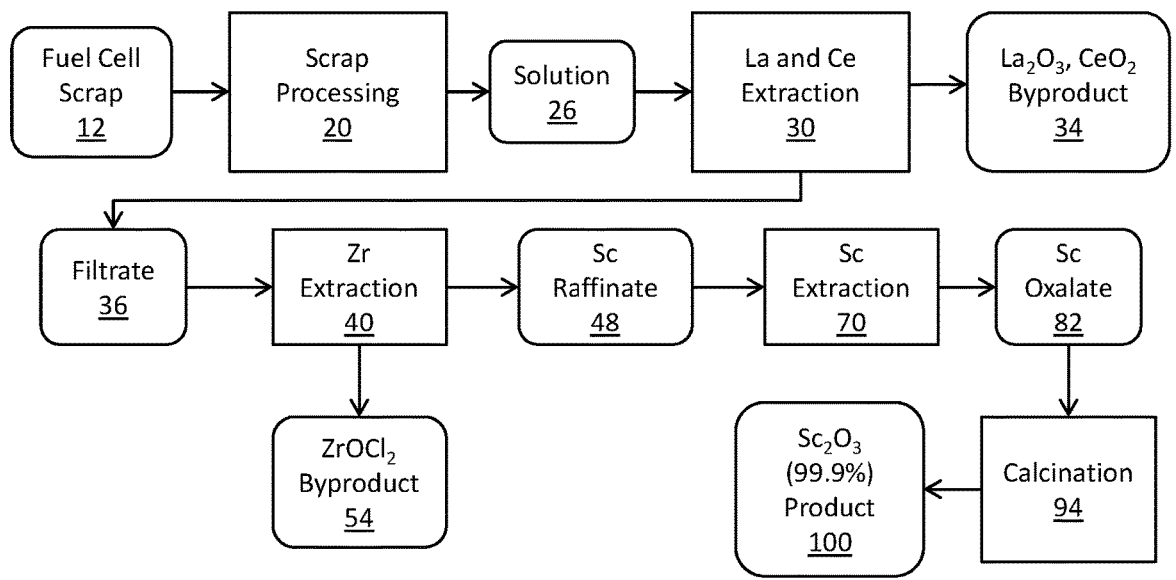
FIG. 1 is a flow diagram showing a method for the selective recovery of scandium from fuel cell scrap, according to various embodiments of the present disclosure.

As used herein, selective removal of an ion or compound generally refers to methods to facilitate the removal of the ion or compound from solutions. As used herein, the selective removal of scandium generally refers to methods to facilitate the removal of scandium (III) ions ($Sc^{3+}$) or scandium-containing compounds from a solution.

As used herein, solvent extraction refers to extracting a substance from one liquid phase (e.g., an aqueous solution) into a different liquid phase (e.g., an organic solvent) based on the relative solubility of the substance in each of the phases.

Scandium oxide (i.e., scandia) and more particularly scandium (III) oxide, is described herein as the end product of the various embodiment methods. However, scandium (III) oxide is given merely as an example, and the methods described herein may be used in the production of other useful products, including, but not limited to, non-stoichiometric scandium oxide, scandium(III) chloride ($ScCl_3$), scandium(III) hydroxide ($Sc(OH)_3$), and scandium(III) oxalate ($Sc_2(C_2O_4)_3$). These products are collectively referred to herein as "scandium compound end products".

Solid oxide fuel cell systems may include one or more fuel cell stacks to generate electricity. Each stack may include fuel cells disposed between fuel cell interconnects. The fuel cells may include a solid oxide electrolyte disposed between anode and cathode electrodes. At the end of the life cycle of a stack, the stacks may be singulated to recover the metal interconnects, such as chromium—iron alloy interconnects, as described in U.S. published patent application publication number 2017/0244114 A1, incorporated herein by reference in its entirety. During this process, fuel cell scrap is generated as the solid fuel cells are separated from the interconnects.

The solid oxide fuel cells may include a scandia stabilized zirconia electrolyte, such as a scandia and ceria stabilized zirconia electrolyte, as described in U.S. Pat. No. 8,580,456 which is incorporated herein by reference in its entirety. The electrolyte may contain an anode electrode comprising a cermet, such as a nickel and doped ceria containing cermet, and a cathode electrode comprising a perovskite material, such as lanthanum strontium manganate.

Solid oxide fuel cells are configured to withstand high temperatures. As such, fuel cell scrap may include various valuable materials. For example, fuel cell scrap may contain about 10% scandia, about 10% $La_2O_3$, about 5% ceria, about 70% $ZnO_2$ and remainder other fuel cell materials, such as nickel, strontium and manganese. As noted above, the recovery of the Sc is of particular importance, due to the high value thereof.

Methods for the selective recovery of scandium, e.g., scandium compound end products, for example, in the form of scandium oxide from solid oxide fuel cell scrap materials are provided. The steps of the various embodiments may include: solvent extraction (e.g., cross-current solvent extraction) to load at least one stage (e.g., multiple stages) of an organic phase with scandium ions (e.g., $Sc^{3+}$) from a solution; stripping scandium ions from the organic phase; precipitation of a scandium oxalate product from the filtrate;

and drying and calcination a product containing scandium oxide (e.g., $Sc_2O_3$). According to the preferred embodiments, other valuable byproducts may also be generated. In addition, various reactants may be regenerated and recycled back for reuse in different steps of the process.

FIG. 1 is a flow diagram showing a method for the selective recovery of scandium from fuel cell scrap 12, according to various embodiments of the present disclosure. Referring to FIG. 1, in step in step 20, the fuel cell scrap 12 undergoes processing to form a solution 26. For example, the fuel cell scrap 12 may be reduced in size, digested with an acid, and mixed with water. However, the present disclosure is not limited to any particular method of forming the solution 26.

In step 30, La and Ce are extracted from the solution 26 to form a byproduct 34 containing La and Ce and a filtrate 36 containing Zr and Sc. The extraction may be performed by any suitable method, such as precipitation or the like, that is configured to selectively remove La and Ce from the solution 26

In step 40, Zr may be extracted from the filtrate 36 to produce a byproduct 54 containing Zr and a raffinate 48 containing Sc. Any suitable method of selectively extracting Zr may be used. In step 70, Sc is extracted from the raffinate 48 to generate Sc oxalate 82. In step 94, the Sc oxalate 82 may be calcined to generate an end product 100 including $Sc_2O_3$.

In some embodiments, one or more of the above steps may be optional, and thus, may be omitted. For example, one or more of steps 30, 40, 70 and/or 94 may be omitted, in some embodiments.

Figure 2:
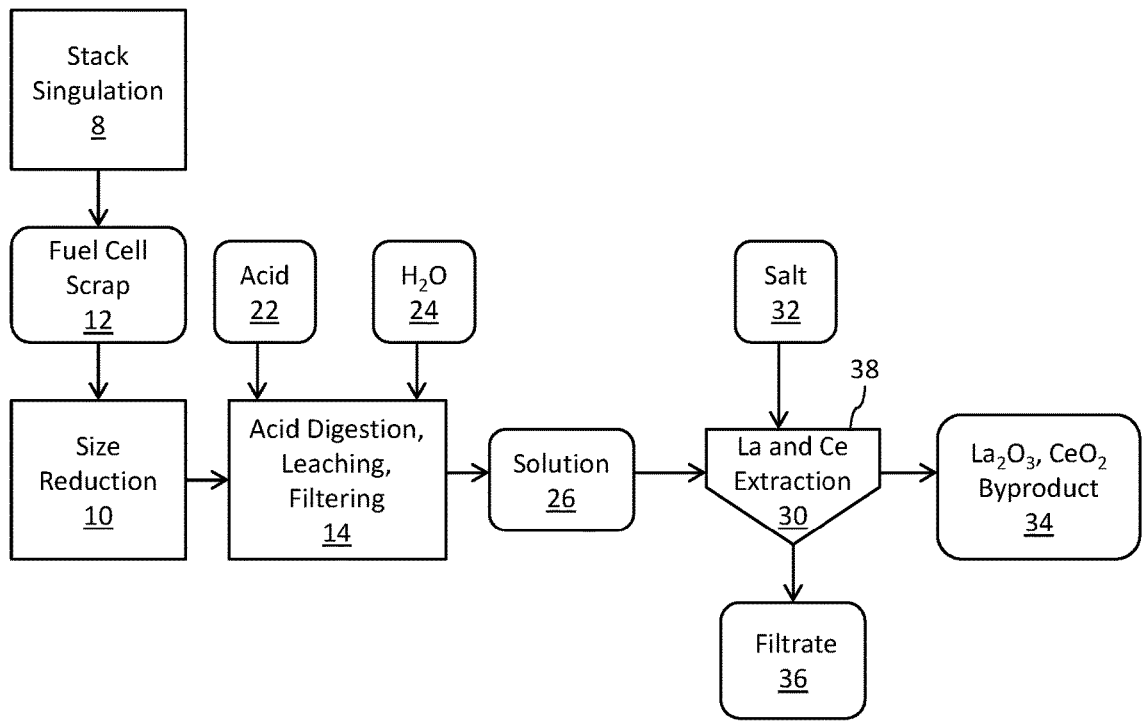
FIG. 2 is a flow chart illustrating particular methods for implementing steps 20 and 30 of FIG. 1.
Figure 3:
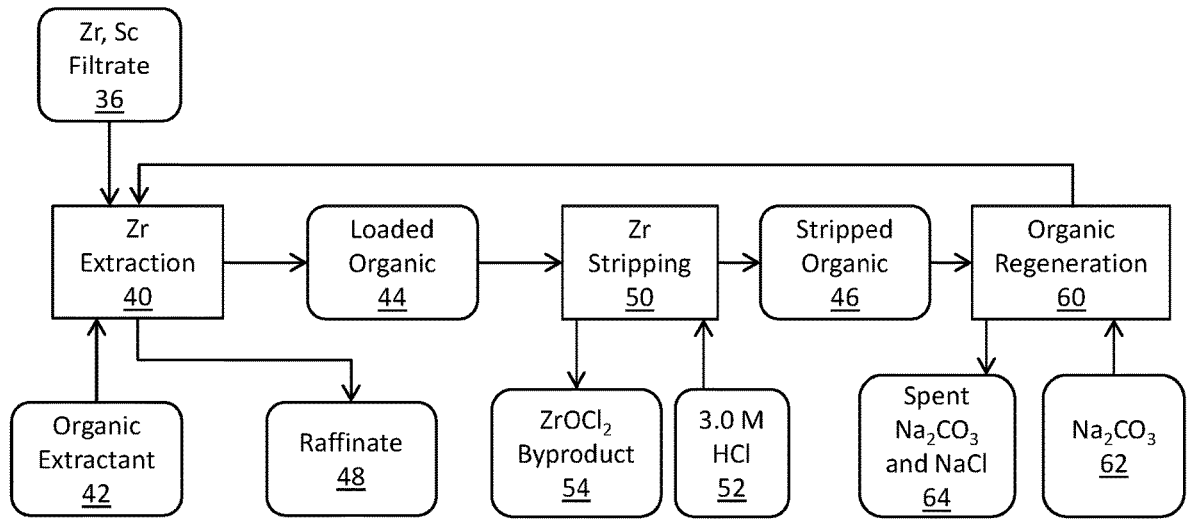
FIG. 3 is a flow diagram illustrating particular methods of implementing the Zr extraction of step 40 of FIG. 1.
Figure 4:
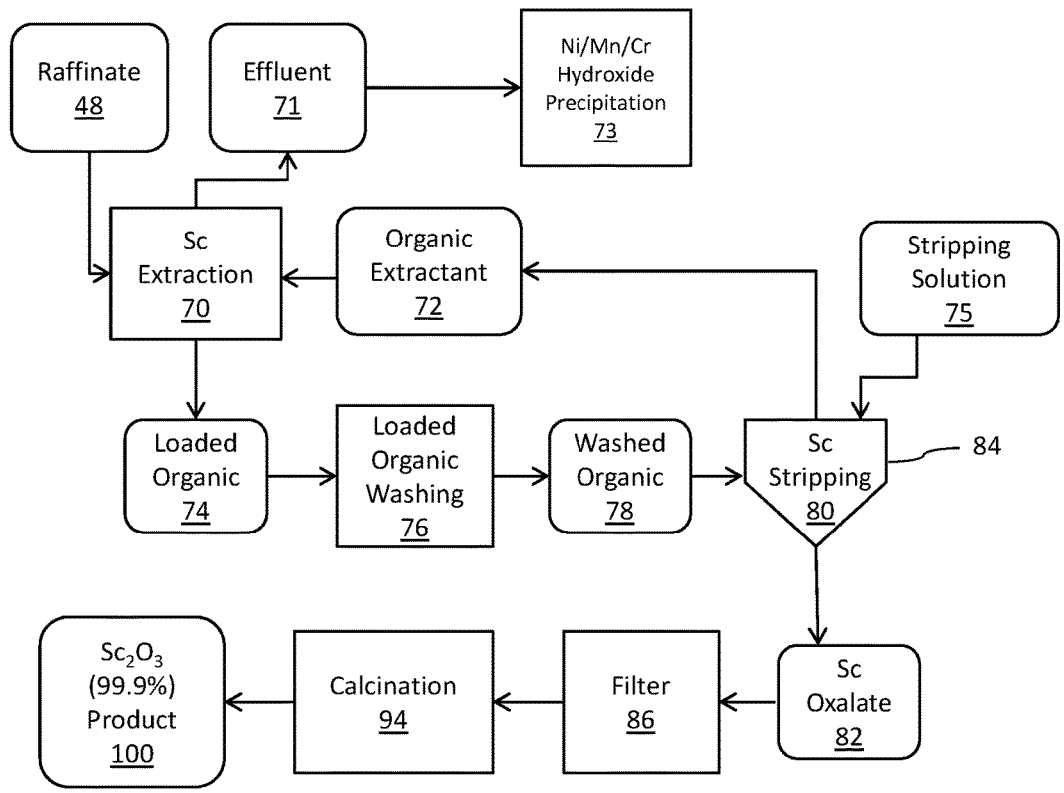
FIG. 4 is a flow diagram illustrating particular methods of implementing the Sc extraction of step 70 of FIG. 1.
Figure 5:
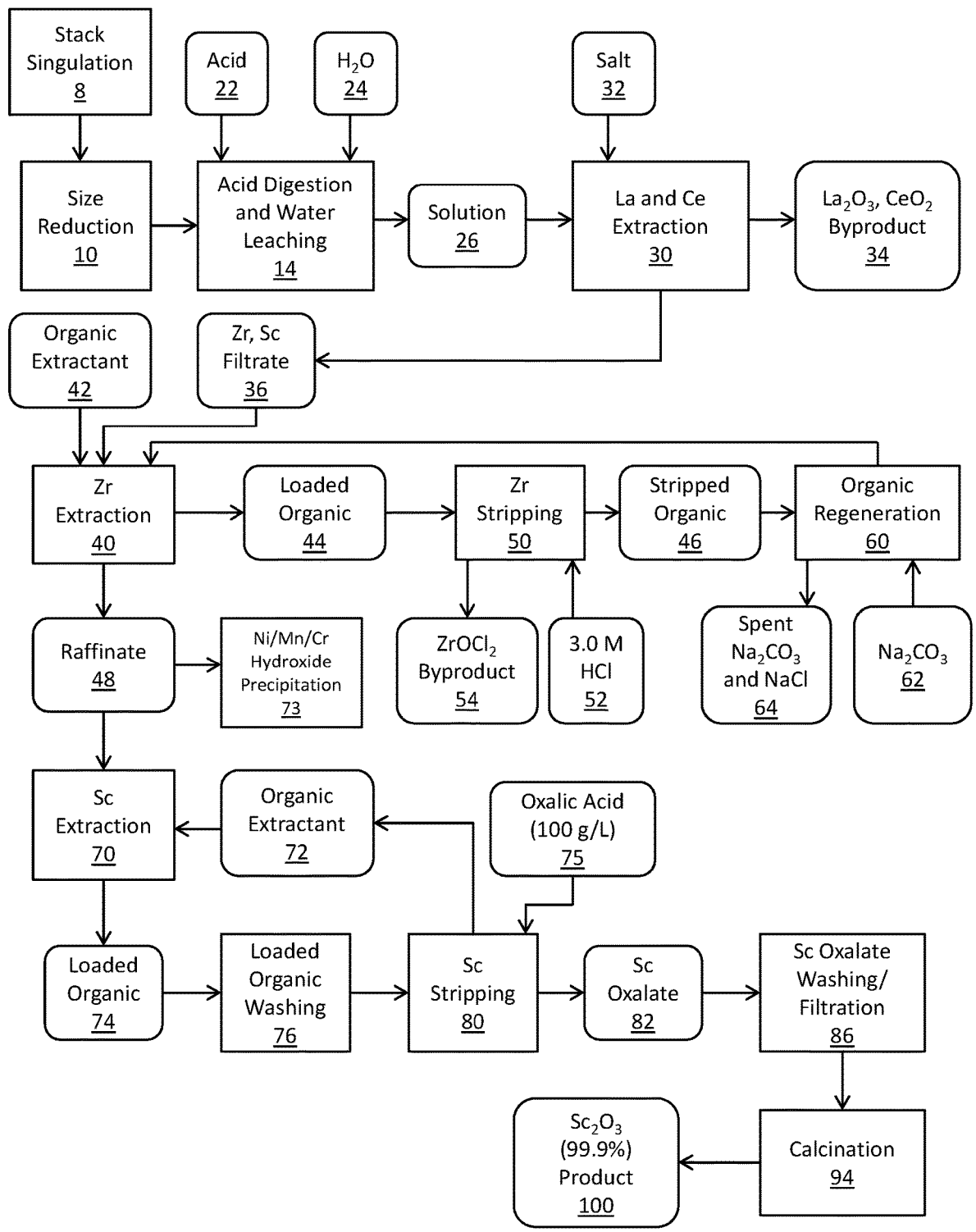
FIG. 5 is a flow diagram showing a combination of the methods of FIGS. 2-4.

FIG. 2 is a flow chart illustrating particular methods of generating the fuel cell scrap 12 and implementing steps 20 and 30 of FIG. 1, according to various embodiments of the present disclosure. FIG. 3 is a flow diagram illustrating particular methods of implementing the Zr extraction of step 40. FIG. 4 is a flow diagram illustrating particular methods of implementing the Sc extraction of step 70 and generating the product 100. FIG. 5 is a flow diagram showing a combination of the methods of FIGS. 2-4.

Referring to FIG. 2, in step 8, a SOFC fuel cell stack is singulated to separate fuel cell interconnects from fuel cells disposed therebetween, thereby generating fuel cell scrap 12. The fuel cell scrap 12 may be in a form of flakes, such as ceramic electrolyte material flakes. In step 10, the fuel cell scrap 12 is processed by milling or crushing, for example, to reduce the particle size thereof. The flakes may be milled or crushed to form a powder. For example, the fuel cell scrap 12 flakes may be processed to form a powder having an average particle size of less than about 100 µm, such as from about 75 µm to about 25 µm, or from about 70 µm to about 50. As such, subsequent processing of the scrap 12 may be reduced, and scandia may be recovered in a reduced amount of time, such as from about 6 to about 10 hours, or about 8 hours.

In step 14, the processed scrap is digested and mixed with a solvent to form a solution 26. In particular, the processed scrap may be digested with an acid 22, such as hydrochloric acid (HCl), sulfuric acid ($H_2SO_4$), or the like, to form a slurry. The acid 22 may be configured to dissolve electrode components from electrolyte components of the processed scrap. The digestion may occur at an elevated temperature, such as a temperature ranging from about at 200-280° C. (typically 230° C.), to increase the reaction rate of the acid 22.

Water 24 may then be mixed with the slurry to form a solution 26. The solution 26 may include all of the components of the processed scrap. In other embodiments, the slurry may be filtered and/or leached to remove one or more components, such that the solution 26 contains only the major components (e.g., electrolyte components) of the processed scrap. For example, dissolved electrode components may be leached from the slurry.

In step 30, the method may include extracting La and Ce and/or compounds thereof, from the solution 26. For example, a salt 32, such as sodium sulfate, configured to precipitate $CeO_2$ and $La_2O_3$ may be added to the solution 26.

The salt 32 may result in the precipitation Ce and La salts (e.g., a double salt precipitation). In particular, the solution 26 and salt 32 mixture may be provided into a settler and/or filter device 38 where the Ce and La salts are precipitated and filtered. The precipitated salts may be filtered and dried to produce an acidic aqueous filtrate 36 and a byproduct 34 containing La and Ce. The byproduct 34 may be dried to form a cake containing from about 5 wt % to about 15 wt % $CeO_2$, such as about 10 wt % $CeO_2$, and from about 20 wt % to about 30 wt % $La_2O_3$, such as about 25 wt % $La_2O_3$. During this process, Zr and Sc and/or compounds thereof may remain in the filtrate 36.

Referring to FIG. 3, in step 40, Zr may be extracted from the acidic aqueous filtrate 36 using an organic extraction process. In particular, the filtrate 36 may be contacted with an organic extractant 42 in a zirconium solvent extraction process. The organic extractant 42 may include a complexing agent that complexes with (i.e., bonds to) Zr from the aqueous phase and returns into the organic phase. The organic extractant 42 may include an organic complexing agent that includes one or more functional amine groups that are configured to complex with Zr. In some embodiments, the complexing agent may be a tertiary amine complexing agent. In some embodiments the complexing agent has one or more amine functional group and C5-C12 carbon chain. Zr binds to the amine group. Preferably, the extractant does not bind to/complex with Sc. Preferably, the extractant is a straight chain amine with C8-C10 in the alkyl group, (e.g. BASF Alamine® 336). In some embodiments, the organic extractant 42 may include the complexing agent at 5-20% (v/v), such as 10% (v/v) concentration, in an organic solvent.

In an embodiment, the organic extractant 42 may include a diluent and/or a modifier at 5-20% (v/v), such as 10% (v/v) concentration. The modifier is any compound that improves transport across the boundary between the aqueous and organic phases and aids in disengagement of the phases. That is, the modifier helps drops of organic phase located in the aqueous phase to coalesce into the organic phase. Example modifiers include long chain alcohols, e.g. with a C8-C15 carbon chain. Suitable alcohols include both straight and branched alcohols. In a preferred embodiment, the alcohol comprises a carbon chain that includes 12 carbons, such as tridecyl alcohol (e.g., Exxal™ 13).

The diluent may be any material that improves the solubility of the organic extractant in the organic phase, such as kerosene or a dearomatized hydrocarbon fluid (e.g., Exxsol™ D80). In an embodiment, the organic phase may have a composition of 5-15% (v/v) complexing agent (e.g., amine), 5-15% (v/v) modifier, and a balance (e.g., 65-85% (v/v)) of diluent (e.g., dearomatized hydrocarbon fluid).

During step 40, the organic amine of the organic extractant 42 may be loaded with zirconium ions from the filtrate 36, thereby forming a loaded organic phase 44. The loaded organic phase 44 may be separated from the filtrate 36 using a solvent extraction process, thereby generating a raffinate 48. The solvent extraction of step 40 may be carried out, for example, in any suitable solvent extraction plant using one or more mixer-settlers in single or multi stage (such as 2-5, such as 3 stages) process. In an embodiment, step 40 results in removal of the Zr (e.g. 0.1 g/L or less Zr remains in the raffinate 48) from the filtrate 36 with no significant loss (e.g. less than 1% (M/M)) of Sc from the filtrate 36/raffinate 48.

In step 50, the Zr can be stripped from the loaded organic phase 44 with a strong acid 52 (e.g. 2-6M, such as 3M HCl) from an acid feed tank to allow recovery of pure $ZrOCl_2$ or $ZrO_2$ 54 from the acidic Zr strip slurry or solution, if desired. For example, the stripped Zr may be concentrated/crystallized, filtered and dried to produce $ZrOCl_2$ crystals.

The remaining stripped organic phase extractant 46 may be regenerated in step 60, by treating it with an alkaline solution 62 (e.g., 40-100 g/L $Na_2CO_3$, or 20-100 g/L NaOH) from a recycle tank, to reactivate the amine containing organic phase. The organic phase may then be reused in step 40 leaving sodium carbonate and sodium chloride byproducts 64.

Referring to FIG. 4, in step 70, the raffinate 48 is mixed with an organic extractant 72 to selectively extract Sc from the raffinate 48. The organic extractant 72 may include a complexing agent configured to complex with Sc. For example, the complexing agent may be an organophosphorus extractant (e.g. a dialkyl phosphinic acid extractant, such as Cytec Cyanex 272®, which comprises bis(2,4,4-trimethylpentyl) phosphinic acid) at 5-15%, or at about 10% (v/v) concentration. In an embodiment, the organic extractant 72 may also include a modifier (e.g. tri-butyl phosphate TBP) at 5-15% (v/v), such as 10% (v/v) concentration in a diluent (e.g. Exxsol D80 or kerosene). Sc binds with the complexing agent of the organic extractant 72 to produce a loaded organic phase 74.

The loaded organic phase 74 is separated from an effluent 71 including a remainder of the raffinate 48. In step 73, any remaining metals from the anode and cathode electrodes of the fuel cells, such as, Ni, Mn, and/or Sr, may be precipitated from the effluent 71 using lime and/or sodium hydroxide and recovered, before the effluent 71 is discharged.

In step 76, the loaded organic phase 74 is washed to generate a washed organic phase 78. The loaded organic phase 74 may be washed with a salt solution, such as a 15 g/L NaCl salt solution, to remove any entrained aqueous phase along with iron, calcium and other un-complexed metals. The salt solution may be further processed for reuse (e.g. to remove Ca, Fe, etc.).

In step 80, a stripping solution 75 is mixed with the washed organic phase 78 to remove the Sc. The stripping solution 75 may comprise, for example, a 75-150 g/L, such as 100 g/L oxalic acid solution, at 40-80° C. (typically 60° C.). Step 80 results in the precipitation of the Sc as scandium oxalate ($Sc_2(C_2O_4)_3$) 82 in an aqueous suspension or mixture. In an embodiment, the mixture of the washed loaded organic phase 78 and the stripping solution 75 may be provided to a settler/separator 84. The scandium oxalate containing output from the settler 84 is then provided to a filter 86 to separate the scandium oxalate 82 from the oxalic acid containing filtrate. The filtrate (e.g., the remaining organic extractant 72) may be recycled for further use. This recycled stream may be monitored for buildup of impurities (e.g. Zr) and periodically a bleed stream may be treated to reduce the level of impurities in the circuit.

In step 94, the filtered scandium oxalate precipitate may be dried of excess moisture and calcined (i.e., heated to convert $Sc_2(C_2O_4)_3$ to $Sc_2O_3$) at 700-800 degrees Celsius, to obtain a scandium compound end product 100 (e.g., a scandium oxide solid composition). The end product 100 may include at least 99 wt %, such as about 99 wt % to about 99.9 wt % scandium oxide.

Referring to FIG. 5, the methods of FIGS. 2-4 are shown in a combined flow diagram. As can be seen in FIG. 5, fuel cell scrap can be processed in a continuous manner along an uninterrupted flow path to recover scandia.

As is understood in the art, not all equipment or apparatuses are shown in the figures. For example, one of skill in the art would recognize that various holding tanks and/or pumps may be employed in the present method.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the steps as a sequential process, many of the steps can be performed in parallel or concurrently.

Any reference to claim elements in the singular, for example, using the articles "a," "an" or "the" is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The invention claimed is:

1. A method of recovering metal compounds from solid oxide fuel cell scrap, the method comprising:
   processing the solid oxide fuel cell scrap to form a powder of processed scrap;
   digesting the processed scrap;
   extracting lanthanum oxide and cerium oxide from a solution containing the digested processed scrap;
   extracting a zirconium compound from the solution after extracting the lanthanum oxide and cerium oxide; and
   extracting a scandium compound from the solution after extracting the zirconium compound from the solution.

2. The method of claim 1, wherein:
   the fuel cell scrap comprises ceramic flakes;
   processing the solid oxide fuel cell scrap comprises milling or crushing the ceramic flakes to form the powder of the processed scrap;
   the powder of the processed scrap has an average particle size of less than about 100 µm; and
   the digesting comprises mixing the processed scrap with an acid, while heating the processed scrap.

3. The method of claim 2, further comprising mixing the digested scrap with water to form the solution containing the digested processed scrap.

4. The method of claim 1, wherein extracting lanthanum oxide and cerium oxide comprises:
   adding a salt to the solution to form a precipitate comprising Ce and La;
   filtering the solution to separate the precipitate from a filtrate; and drying the precipitate to form a cake comprising $La_2O_3$ and $CeO_2$.

5. The method of claim 4, where the cake comprises, based on the total weight of the cake:
from about 5 wt % to about 15 wt % $CeO_2$; and
from about 20 wt % to about 30 wt % $La_2O_3$.

6. The method of claim 4, wherein extracting the zirconium compound from the solution comprises:
adding a first organic extractant to the filtrate, thereby forming a first loaded organic phase comprising complexed Zr;
extracting the first loaded organic phase from the filtrate, thereby generating a raffinate comprising remaining components of the filtrate; and
stripping the Zr from the first loaded organic phase to form the zirconium compound.

7. The method of claim 6, wherein the zirconium compound comprises $ZrOCl_2$ or $ZrO_2$.

8. The method of claim 6, wherein the first organic extractant comprises:
an organic tertiary amine Zr complexing agent;
a tridecyl alcohol modifier; and
a kerosene or dearomatized hydrocarbon fluid dilutant.

9. The method of claim 6, wherein the stripping comprises mixing aqueous HCl with the first loaded organic phase.

10. The method of claim 6, further comprising:
adding a second organic extractant to the raffinate, thereby forming a second loaded organic phase comprising complexed Sc;
extracting the second loaded organic phase from the raffinate, thereby generating an effluent comprising remaining components of the raffinate; and
stripping the Sc from the second loaded organic phase to form a scandium oxalate.

11. The method of claim 10, further comprising calcining the scandium oxalate to form $Sc_2O_3$.

12. The method of claim 10, wherein the second organic extractant comprises:
a dialkyl phosphinic acid scandium complexing agent;
a tri-butyl phosphate modifier; and
a kerosene or dearomatized hydrocarbon fluid dilutant.

13. The method of claim 10, wherein the stripping the Sc comprises adding oxalic acid to the second loaded organic phase to form the scandium oxalate.

14. The method of claim 10, further comprising washing the second loaded organic phase with a salt solution, prior to the stripping the Sc.

15. The method of claim 10, further comprising recovering at least one metal selected from Ni, Mn, or Sr by precipitation from the effluent using at least one of lime or sodium hydroxide.

16. The method of claim 1, further comprising:
singulating a solid oxide fuel cell stack comprising metal interconnects and solid oxide fuel cells; and
separating the fuel cell scrap from the metal interconnects.

17. The method of claim 16, wherein the solid oxide fuel cells comprise a scandia and ceria stabilized zirconia electrolyte.

\* \* \* \* \*